US009749710B2

(12) United States Patent
Ramaswamy

(10) Patent No.: US 9,749,710 B2
(45) Date of Patent: Aug. 29, 2017

(54) VIDEO ANALYSIS SYSTEM

(71) Applicant: Excalibur IP, LLC, New York, NY (US)

(72) Inventor: Sneha Modlur Ramaswamy, Bangalore (IN)

(73) Assignee: Excalibur IP, LLC, New York, NY (US)

( * ) Notice: Subject to any disclaimer, the term of this patent is extended or adjusted under 35 U.S.C. 154(b) by 0 days.

(21) Appl. No.: 13/782,786

(22) Filed: Mar. 1, 2013

(65) Prior Publication Data

US 2014/0250457 A1    Sep. 4, 2014

(51) Int. Cl.
| | |
|---|---|
| *H04N 7/10* | (2006.01) |
| *H04N 21/81* | (2011.01) |
| *H04N 21/234* | (2011.01) |
| *H04N 21/2668* | (2011.01) |
| *H04N 21/475* | (2011.01) |

(52) U.S. Cl.
CPC ..... *H04N 21/812* (2013.01); *H04N 21/23418* (2013.01); *H04N 21/2668* (2013.01); *H04N 21/475* (2013.01)

(58) Field of Classification Search
CPC ......... H04N 21/23418; H04N 21/2668; H04N 21/475; H04N 21/812
USPC .................... 725/34, 60; 707/784
See application file for complete search history.

(56) References Cited

U.S. PATENT DOCUMENTS

| | | | | |
|---|---|---|---|---|
| 6,177,931 B1* | 1/2001 | Alexander | ......... | G06Q 30/0269 348/565 |
| 6,314,398 B1* | 11/2001 | Junqua | ......... | G10L 15/1822 348/E5.105 |
| 8,196,168 B1* | 6/2012 | Bryan | ......... | G06F 17/30017 715/753 |
| 8,655,056 B2* | 2/2014 | Singh | ......... | G06F 17/30781 382/124 |
| 8,782,690 B2* | 7/2014 | Briggs | ......... | H04N 21/435 725/32 |
| 8,839,306 B2* | 9/2014 | Roberts | ......... | H04N 7/17318 725/11 |

(Continued)

FOREIGN PATENT DOCUMENTS

EP    1772854 A1 *   4/2007    ....... G06F 17/30401

OTHER PUBLICATIONS http://en.wikipedia.org/wiki/Outline_of_object_recognition, published prior to filing.

(Continued)

*Primary Examiner* — An Son P Huynh
(74) *Attorney, Agent, or Firm* — Brinks Gilson & Lione

(57) ABSTRACT

A system may include an interface, memory, and a processor configured to execute instructions stored in the memory. The interface may be configured to receive a signal that may include one or more user-selected frames of video content. The processor may execute the instructions to identify a market-relevant video object in the one or more frames. The processor may also facilitate storing in the memory, market-relevant information associated with the market-relevant video object. The processor may also execute the instructions to compare the stored market-relevant information to stored advertisement information and determine ad request criteria and/or advertisement for distribution to a user based on the comparison.

16 Claims, 6 Drawing Sheets

(56) References Cited

U.S. PATENT DOCUMENTS

| | | | |
|---|---|---|---|
| 2002/0069218 A1* | 6/2002 | Sull | G06F 17/30796 715/202 |
| 2002/0069405 A1* | 6/2002 | Chapin | H04N 7/162 725/32 |
| 2002/0097984 A1* | 7/2002 | Abecassis | G06F 3/04842 715/723 |
| 2002/0174425 A1* | 11/2002 | Markel | H04N 7/165 725/13 |
| 2004/0133909 A1* | 7/2004 | Ma | G06Q 30/0207 725/34 |
| 2004/0221311 A1* | 11/2004 | Dow | G06F 17/30784 725/52 |
| 2005/0132401 A1* | 6/2005 | Boccon-Gibod | G11B 27/002 725/34 |
| 2005/0149964 A1* | 7/2005 | Thomas | G06Q 30/02 725/9 |
| 2005/0210145 A1* | 9/2005 | Kim | G06F 17/30849 709/231 |
| 2006/0015409 A1* | 1/2006 | Kato | H04H 60/33 705/26.1 |
| 2006/0120624 A1* | 6/2006 | Jojic | G06F 17/30843 382/284 |
| 2007/0157260 A1* | 7/2007 | Walker | H04N 7/163 725/86 |
| 2007/0214172 A1* | 9/2007 | Nister | G06K 9/6282 |
| 2008/0155627 A1* | 6/2008 | O'Connor | H04N 7/173 725/109 |
| 2008/0184121 A1* | 7/2008 | Kulas | G06F 3/04842 715/723 |
| 2008/0300854 A1* | 12/2008 | Eibye | G06K 9/325 704/3 |
| 2009/0006191 A1* | 1/2009 | Arankalle | G06F 17/30056 715/723 |
| 2009/0019487 A1* | 1/2009 | Kulas | H04N 5/44543 725/41 |
| 2009/0063994 A1* | 3/2009 | Pickelsimer | G06F 17/30017 715/753 |
| 2009/0092374 A1* | 4/2009 | Kulas | H04N 7/173 386/248 |
| 2009/0094520 A1* | 4/2009 | Kulas | G06F 17/30056 715/723 |
| 2009/0138906 A1* | 5/2009 | Eide | G06F 17/30038 725/32 |
| 2009/0164904 A1* | 6/2009 | Horowitz | G06F 17/30817 715/723 |
| 2009/0222854 A1* | 9/2009 | Cansler | G11B 27/034 386/290 |
| 2009/0249223 A1* | 10/2009 | Barsook | H04N 7/173 725/109 |
| 2009/0328122 A1* | 12/2009 | Amento | H04N 7/173 386/248 |
| 2010/0005488 A1* | 1/2010 | Rakib | G06F 17/30799 725/34 |
| 2010/0017474 A1* | 1/2010 | Kandekar | G11B 27/034 715/810 |
| 2010/0088726 A1* | 4/2010 | Curtis | G11B 27/034 725/45 |
| 2010/0153885 A1* | 6/2010 | Yates | H04N 5/44543 725/41 |
| 2010/0251295 A1* | 9/2010 | Amento | H04N 7/17318 725/11 |
| 2011/0072350 A1* | 3/2011 | Bachtiger | G06F 17/30746 715/727 |
| 2011/0072452 A1* | 3/2011 | Shimy | H04N 7/163 725/25 |
| 2011/0153412 A1* | 6/2011 | Novikov | G06Q 30/02 705/14.42 |
| 2011/0194839 A1* | 8/2011 | Gebert | G11B 27/034 386/290 |
| 2011/0246937 A1* | 10/2011 | Roberts | G11B 27/034 715/810 |
| 2012/0036015 A1* | 2/2012 | Sheikh | G06Q 30/02 705/14.54 |
| 2012/0047119 A1* | 2/2012 | Kandekar | G06F 17/30855 707/705 |
| 2012/0069131 A1* | 3/2012 | Abelow | G06Q 10/067 348/14.01 |
| 2012/0093476 A1* | 4/2012 | Mountain | G06F 17/30849 709/231 |
| 2012/0095819 A1* | 4/2012 | Li | G06Q 30/02 705/14.23 |
| 2012/0203799 A1* | 8/2012 | Blanchflower | H04N 21/4524 707/784 |
| 2012/0246685 A1* | 9/2012 | Fink | G06Q 30/02 725/60 |
| 2012/0284105 A1* | 11/2012 | Li | G06Q 30/06 705/14.23 |
| 2012/0324491 A1* | 12/2012 | Bathiche | G06F 17/30817 715/723 |
| 2012/0330752 A1* | 12/2012 | Kim | G06Q 30/02 705/14.54 |
| 2013/0031582 A1* | 1/2013 | Tinsman | H04N 21/2353 725/36 |
| 2013/0036200 A1* | 2/2013 | Roberts | H04L 65/4076 709/219 |
| 2013/0066709 A1* | 3/2013 | Riley | 705/14.42 |
| 2013/0081082 A1* | 3/2013 | Riveiro Insua | H04N 21/8549 725/38 |
| 2013/0086105 A1* | 4/2013 | Hammontree | H04H 60/33 705/26.1 |
| 2013/0091521 A1* | 4/2013 | Phillips | G11B 27/034 725/45 |
| 2013/0117111 A1* | 5/2013 | Dyor | G06F 3/0481 705/14.54 |
| 2013/0160057 A1* | 6/2013 | Chen | G06F 17/30017 725/61 |
| 2013/0259361 A1* | 10/2013 | Singh | G06F 17/30781 382/154 |
| 2013/0312029 A1* | 11/2013 | Huber | G06Q 30/02 725/34 |
| 2014/0040944 A1* | 2/2014 | Zalewski | G06Q 30/02 725/32 |

OTHER PUBLICATIONS http://www.viki.com/channels/8612-simple-plan/videos/70067, published prior to filing.

* cited by examiner

VIDEO ANALYSIS SYSTEM

FIELD

Example embodiments may relate to video analysis systems, such as systems that analyze video content for enhancing distribution of advertisements.

BACKGROUND

In today's media world, ads can be distributed based on content and/or media the ads are distributed with. Ad distribution can also be based on likely viewers of an ad, which can relate to the content and/or media associated with the ad. For example, in distribution of ads that accompany a television program, the distribution can often related to groups of consumers that are likely to view the program. With respect to Internet content, distribution of ads can often relate to key words enter by a user, or the content of a webpage that the user lands on. For example, a person searching for food-related Internet content may receive food-related advertising when receiving search results.

BRIEF DESCRIPTION OF THE DRAWINGS

The systems and methods may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Described herein are systems and methods for video analysis. For example, the systems and methods may provide for analyzing video content and user interaction associated with the video content. The analysis of the video content and the user interaction may be used to determine distribution of advertisements to end users and viewers of video content, for example.

Figure 1:
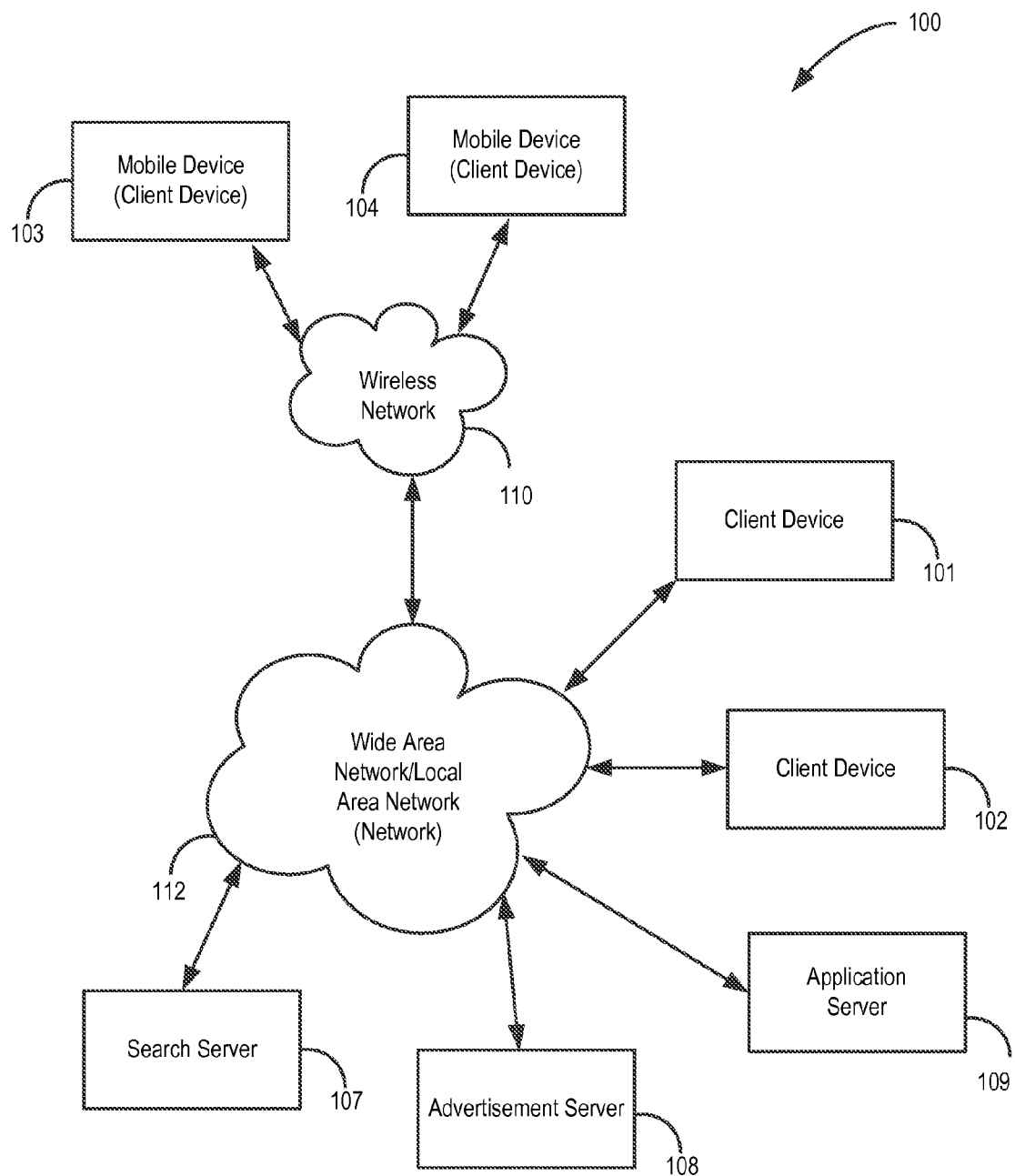
FIG. 1 is a block diagram of an example of a network that can implement an example of a video analysis system.

FIG. 1 is a block diagram of an exemplary network that can implement the video analysis system. In FIG. 1, for example, a network 100 may include a variety of networks, e.g., local area network (LAN)/wide area network (WAN) 112 and wireless network 110, a variety of devices, e.g., client devices 101 and 102 and mobile devices 103 and 104, and a variety of servers, e.g., search server 107, advertisement server 108, and application server 109 (e.g., an application server including an audio/video content server, a web server, an email server, and/or a messaging server).

A network, e.g., the network 100, may couple devices so that communications may be exchanged, such as between servers, servers and client devices or other types of devices, including between wireless devices coupled via a wireless network, for example. A network may also include mass storage, such as network attached storage (NAS), a storage area network (SAN), or other forms of computer or machine readable media, for example. A network may include the Internet, cable networks and other types of television networks, one or more local area networks (LANs), one or more wide area networks (WANs), wire-line type connections, wireless type connections, or any combination thereof. Sub-networks may employ differing architectures or may be compliant or compatible with differing protocols, may interoperate within a larger network. Various types of devices may be made available to provide an interoperable capability for differing architectures or protocols. As one illustrative example, a router may provide a link between otherwise separate and independent LANs.

A communication link or channel may include, for example, cable television channel, a wireless television channel, an analog telephone line, such as a twisted wire pair, a coaxial cable, a full or fractional digital line including a T1, T2, T3, or T4 type line, an Integrated Services Digital Network (ISDN), a Digital Subscriber Line (DSL), a wireless link including satellite link, or another communication link or channel, such as may be known to those skilled in the art. Furthermore, a user device, such as computing device or other related electronic devices, may be remotely coupled to a network, such as via a communication link or channel.

A wireless network, e.g., as wireless network 110, may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

Signal packets communicated via a network, e.g., a network of participating digital communication networks, may be compatible with or compliant with one or more protocols. Signaling formats or protocols employed may include, for example, Transmission Control Protocol/Internet Protocol (TCP/IP), User Datagram Protocol (UDP), or the like. Versions of the Internet Protocol (IP) may include IP version 4 (IPv4) or version 6 (IPv6).

The Internet refers to, for example, a decentralized global network of networks. The Internet may include local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 2:
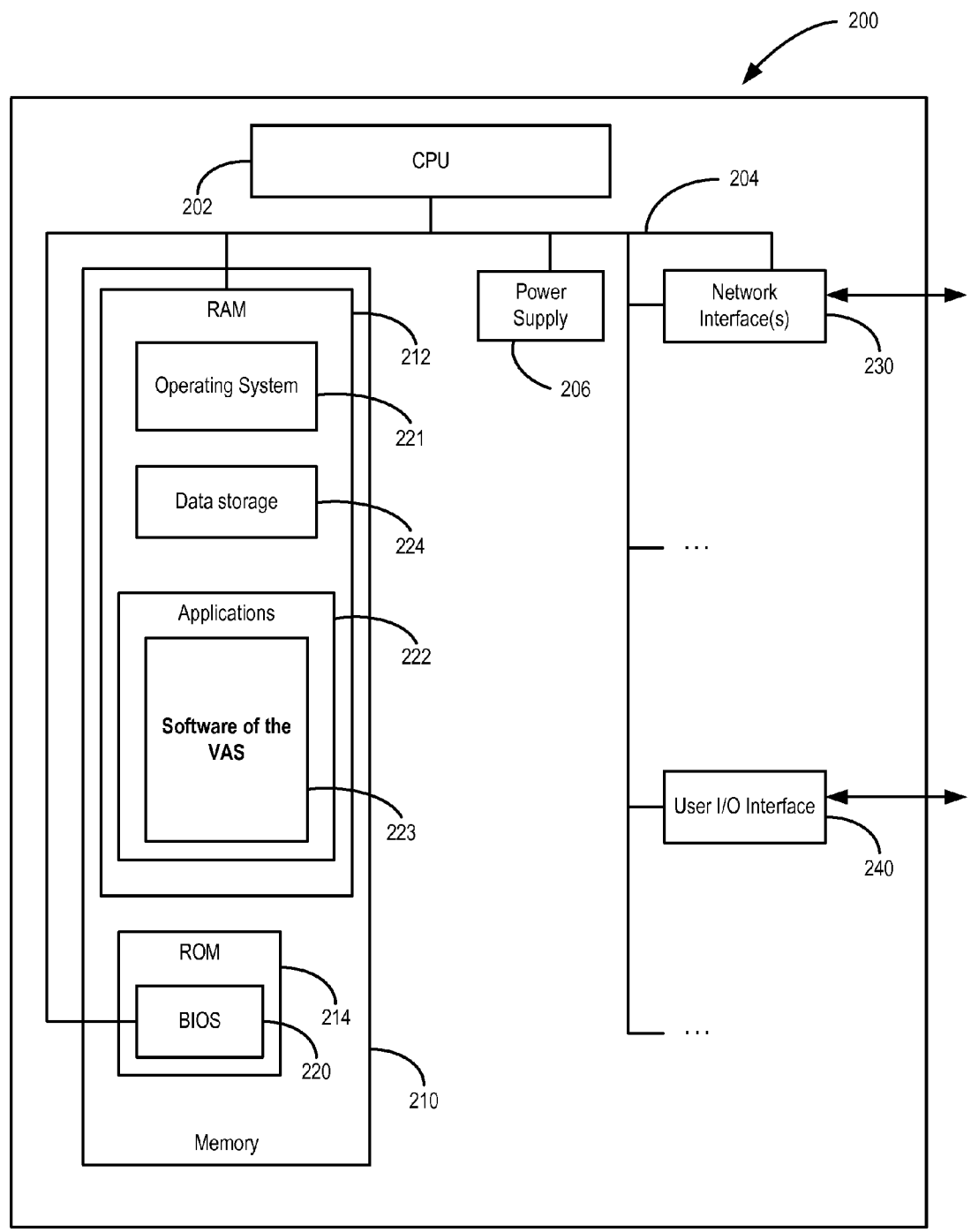
FIG. 2 is a block diagram of an example of an electronic device that can implement an aspect of an example of a video analysis system.

FIG. 2 illustrates a block diagram of an electronic device 200 that can implement an aspect of the video analysis system. Instances of the electronic device 200 may include servers, such as servers 107-109, and client devices, such as client devices 101-104. A client device may be a set-top box, such as a set-top box that can be communicatively coupled with a television set, a desktop computer, such as a desktop computer that may include or can be communicatively coupled with a monitor, a laptop computer, a tablet computer, a smartphone, or a smart TV, for example. In general, the electronic device 200 can include a processor 202, memory 210, a power supply 206, and input/output components, such as a network interface(s) 230, a user input/output interface(s) 240, and a communication bus 204 that connects the aforementioned elements of the electronic device. The network interface(s) 230 can include a receiver and a transmitter (or a transceiver), and an antenna for wireless communications. The processor 202 can be one or more of any type of processing device, such as a central processing unit (CPU). Also, for example, the processor 202 can be central processing logic; central processing logic may include hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include RAM 212 or ROM 214, can be enabled by one or more of any type of memory device, such as a primary (directly accessible by the CPU) and/or a secondary (indirectly accessible by the CPU) storage device (e.g., flash memory, magnetic disk, optical disk). The RAM can include an operating system 221, data storage 224, and applications 222, including of software of the video analysis system (VAS) 223. The ROM can include BIOS 220 of the electronic device 200. The power supply 206 contains one or more power components, and facilitates supply and management of power to the electronic device 200. The input/output components can include any interfaces for facilitating communication between any components of the electronic device 200, components of external devices (such as components of other devices of the network 100), and end users. For example, such components can include a network card that is an integration of a receiver, a transmitter, and one or more I/O interfaces. A network card, for example, can facilitate wired or wireless communication with other devices of a network. In cases of wireless communication, an antenna can facilitate such communication. Also, the I/O interfaces, can include user interfaces such as monitors, keyboards, touchscreens, microphones, and speakers. Further, some of the I/O interfaces and the bus 204 can facilitate communication between components of the electronic device 200, and can ease processing performed by the processor 202.

Where the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set-top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that may include a configuration to provide an application, such as the video analysis system, via a network to another device. Also, an application server may host a website that can provide an end user and/or administrative user interface for the video analysis system.

Examples of content provided by the abovementioned applications, including the video analysis system, may include text, images, audio, video, or the like, which may be processed in the form of physical signals, such as electrical signals, for example, or may be stored in memory, as physical states, for example.

The video analysis system may include a server operable to receive a signal that may include a one or more user-selected frames of video content and/or metadata and/or audio data associated with user-selected frames. The signal may also include a user-entered string. Further, the server may be operable to identify a market-relevant video object in the one or more frames, a market-relevant string portion in the string, and/or a market-relevant audio object in the audio data. Also, the server may be operable to store in memory, market-relevant information associated with the market-relevant video object, the market-relevant string portion, and the market-relevant audio object. The server may also be operable to compare stored market-relevant information to stored advertisement information and determine an advertisement for distribution to a user based on the comparison. Alternatively or additionally, ad request criteria may be determined by an aspect of a server based on the comparison. Market-relevant objects, string portions, and/or information may be associated with any perceivable market-relevant object such as a product, geographic location, person, brand, or recognizable text.

Figure 3:
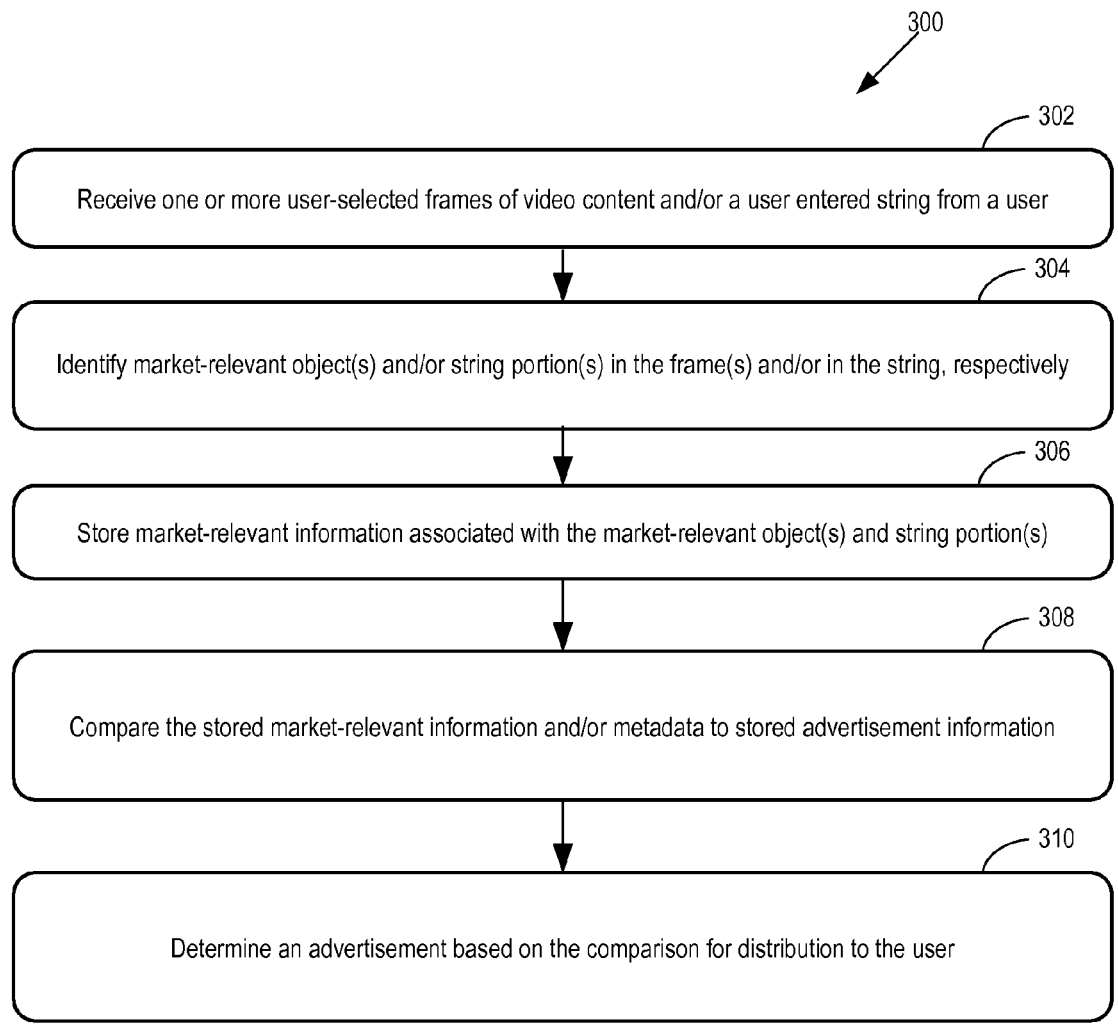
FIG. 3 is a flowchart of an example operation that can be performed by one or more aspects of an example of a video analysis system.

FIG. 3 illustrates a flowchart of an example method that can be performed by one or more aspects of a video analysis system, such as the electronic device 200 (method 300). The method 300 may include receiving at an interface, a signal that may include a user entered string and/or one or more user selected frames of video content, and/or metadata and/or audio data associated with user-selected frames. The method 300 may also include identifying by a processor, a market-relevant video object in the one or more frames, a market-relevant string portion in the string, and/or a market-relevant audio object in the audio data. Also, the method 300 may include storing in memory, market-relevant information associated with the market-relevant video object, the market-relevant string portion, and the market-relevant audio object. Further, the method 300 may include comparing stored market-relevant information to stored advertisement information and determining an advertisement for distribution to a user based on the comparison. Alternatively or additionally, ad request criteria may be determined based on the comparison.

A processor (e.g., the processor 202) can perform the method 300 by executing processing device readable instructions encoded in memory (e.g., the memory 210). The instructions encoded in memory may include a software aspect of the system, such as the VAS software 223.

The method 300 may include an interface aspect of an electronic device (e.g., the network interface(s) 230, the user input/output interface(s) 240) receiving a one or more user selected frames of video content and/or a user entered string from a user (at 302). The frames and string may be communicated from a client device being operated by the user and/or presenting the video content to the user. Also, frames and string may be communicated from an intermediate device that can filter signals including data of the frames and string. The client device may be operated and/or viewed by the user via one or more user interfaces that may be rendered by, embedded in, and/or communicatively couple with the client device. The client device may an electronic device such as the electronic device 200, which may be a smartphone or smart TV, for example.

The one or more user-selected frames of video content may be selected by a user watching a broadcasted, streaming, downloaded, and/or playback video on the client device. The frames may be selected while the content is playing or paused. The video may be live and/or recorded. A user interface, such as a graphical and/or voice operated user interface allows the user to select the one or more user selected frames. The one or more user selected frames may be sequential frames or out of order. Also, a frame of the one or more user-selected frames may be dependent or independent of another frame of the one or more user-selected frames. The frames may also include or be associated with corresponding audio content and/or metadata.

The user-entered string may be inputted by the user while the video content is playing or paused on the client device. The string may be entered in a user input field, such as a search input field. The user input field may be provided to and inputted into to by the user via a graphical, audio, and/or tactile user interface. The user interface may include a touchscreen, keyboard, keypad, remote control, and/or microphone, for example, which may be a part of or communicatively coupled with the client device.

At 304, a processing aspect identifies one or more market-relevant video objects and/or string portions in the one or more frames and/or in the string, respectively. In addition or alternatively, the processing aspect may identify one or more market-relevant sounds, audio objects (such as determined audio objects), and/or words in audio content associated with the one or more frames. The processing aspect may identify the one or more market-relevant video objects in the one or more frames via appearance-based object recognition strategies, such as edge matching, divide-and-conquer search, greyscale matching, gradient matching, histogram based strategies, and use of modelbases. Also, the processing aspect may identify the one or more market-relevant video objects in the one or more frames via feature-based object recognition strategies, such as interpretation trees, hypothesize and test, pose consistency, pose clustering, invariance, geometric hashing, scale-invariant feature transform (SIFT), and speeded up robust features (SURF). Other object recognition technologies may be used as well, such as 3D cues, biologically inspired object recognition, explicit and implicit 3D object models, fast indexing, global scene representations, gradient histograms, grammars, intraclass transfer learning, leveraging internet data, reflectance, shading, template matching, topic models, unsupervised learning, and window-based detection.

A market-relevant object, such as a market-relevant video or audio object, may include any audio and/or visual perceivable object in the media content that an advertiser has designated as relevant to advertising. For example, a market-relevant object may include an object representing an intentional or unintentional product placement in the video content. A market-relevant object may also include any object in the background or foreground of the video content. A market-relevant object may also be animate or inanimate.

The string and/or market-relevant string portion(s) may include one or more symbols, characters, words, and/or phrases. The string and/or market-relevant string portion(s) may include a descriptive word and/or phrase and/or an operator word and/or phrase, such as a Boolean operator, for example. The string and/or market-relevant string portion(s) may be representative of a search input inputted by the user while the video content is playing or paused. The string and/or market-relevant string portion(s) may also be representative of at least portion of a text and/or voice message communicated by the user to another individual while the video content is playing or paused.

A market-relevant string portion may include any symbol, character, word, and/or phrase that an advertiser has designated as relevant to advertising. A market-relevant word may include a word associated with a product or service to be advertised. A string portion or a word may be bid on by advertisers, for example.

At 306, the processing aspect facilitates storing market-relevant information associated with the market-relevant video object(s) and/or string portion(s) to memory and/or a database, for example. Additionally or alternatively, the processing aspect may store metadata associated with the market-relevant string portion(s), the market-relevant video object(s) and/or audio object(s), a frame of the one or more frames, a portion of the video content, such as a designated section, and/or the video content as a whole. The metadata may be stored in the memory and/or the database, for example. In the memory and/or the database, the metadata may be correlated with aspects of the market-relevant information.

At 308, the processing aspect compares the stored market-relevant information and/or the metadata to stored advertisement information. For example, identified objects and their respective metadata, which may include, texture, color, location, make, and/or brand, are stored in a data structure, such as a map data structure. Text input provided by the user may be compared against the metadata. The metadata may be previously determined per object or may be identified via object recognition strategies. The matching metadata and text input may be sent to an ad server for further use, such as comparing the matched metadata and text to stored advertisement information.

The advertisement information may be stored in the memory and/or the database by a device of an advertiser, advertising service, and/or advertising network, for example. The advertisement information may include information pertaining to an advertisement, a group of ads, such as an ad campaign, or one or more portions of an advertisement or group of ads. Additionally or alternatively, the advertisement information may include ad categories and advertising strategies, for example.

At 310, the processing aspect determines an advertisement for distribution to the user at 308. The determination may be based on the comparison. Alternatively or additionally, ad request criteria may be determined based on the comparison.

Once an advertisement is determined, it may be selected and communicated to the client device. The advertisement may be communicated to the client device during the playing or pausing of the video content, or at another time. For example, the interface aspect of the electronic device, may send a request to an advertisement server to transmit the advertisement to the client device to provide the advertisement during playing of the video content.

Additionally or alternatively, the advertisement may be stored in memory and/or a database of the client device and/or another aspect of the video analysis system. The stored advertisement may be selected and communicated to the client device or another electronic device used by the user at time other than when the video content is being presented to the user. For example, a user may submit one or more frames and/or a string to the processing aspect of the video analysis system while watching a first video. During a second video or during presentation of another media type, the video analysis system may communicate the determined advertisement or a similar and/or related advertisement to the user via the second video or presentation of another media type.

Additionally or alternatively, the advertisement may be stored in memory and/or a database of the video analysis system or another system communicatively couple to the video analysis system to be presented to other users. The other users may be part of a group of users in which the user is grouped with as well. Or data associated with the other users may relate to data associated with the user. Such user data may be stored in memory and/or a database of the video analysis system or another system communicatively couple to the video analysis system.

Figure 4:
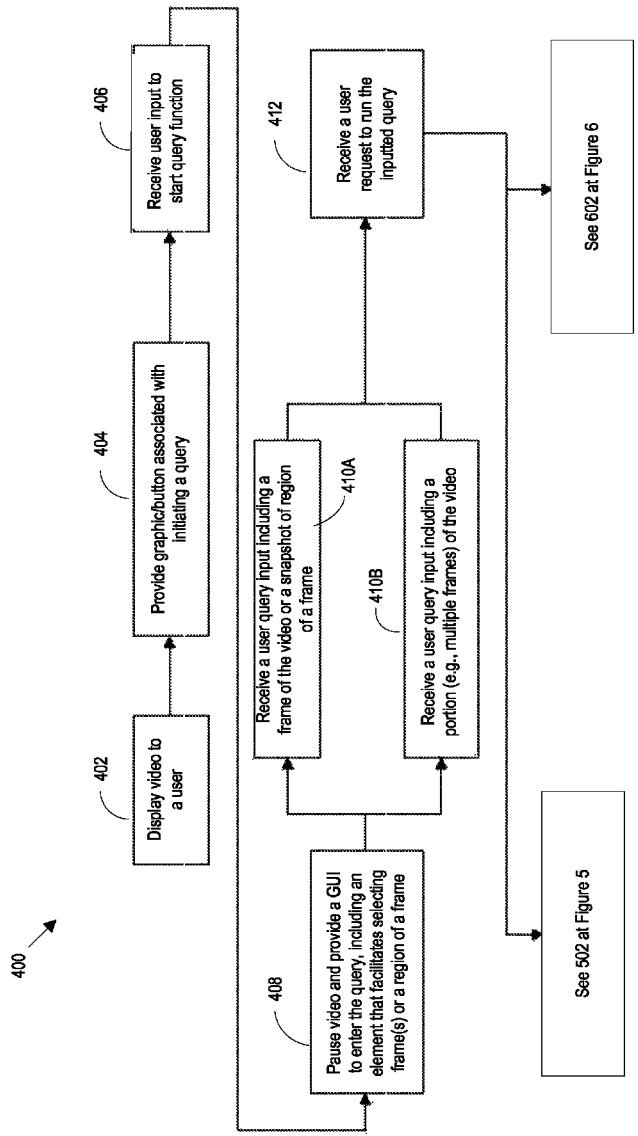
FIGS. 4-6 depict flowcharts of example operations that can be performed by one or more aspects of an example of a video analysis system.
Figure 5:
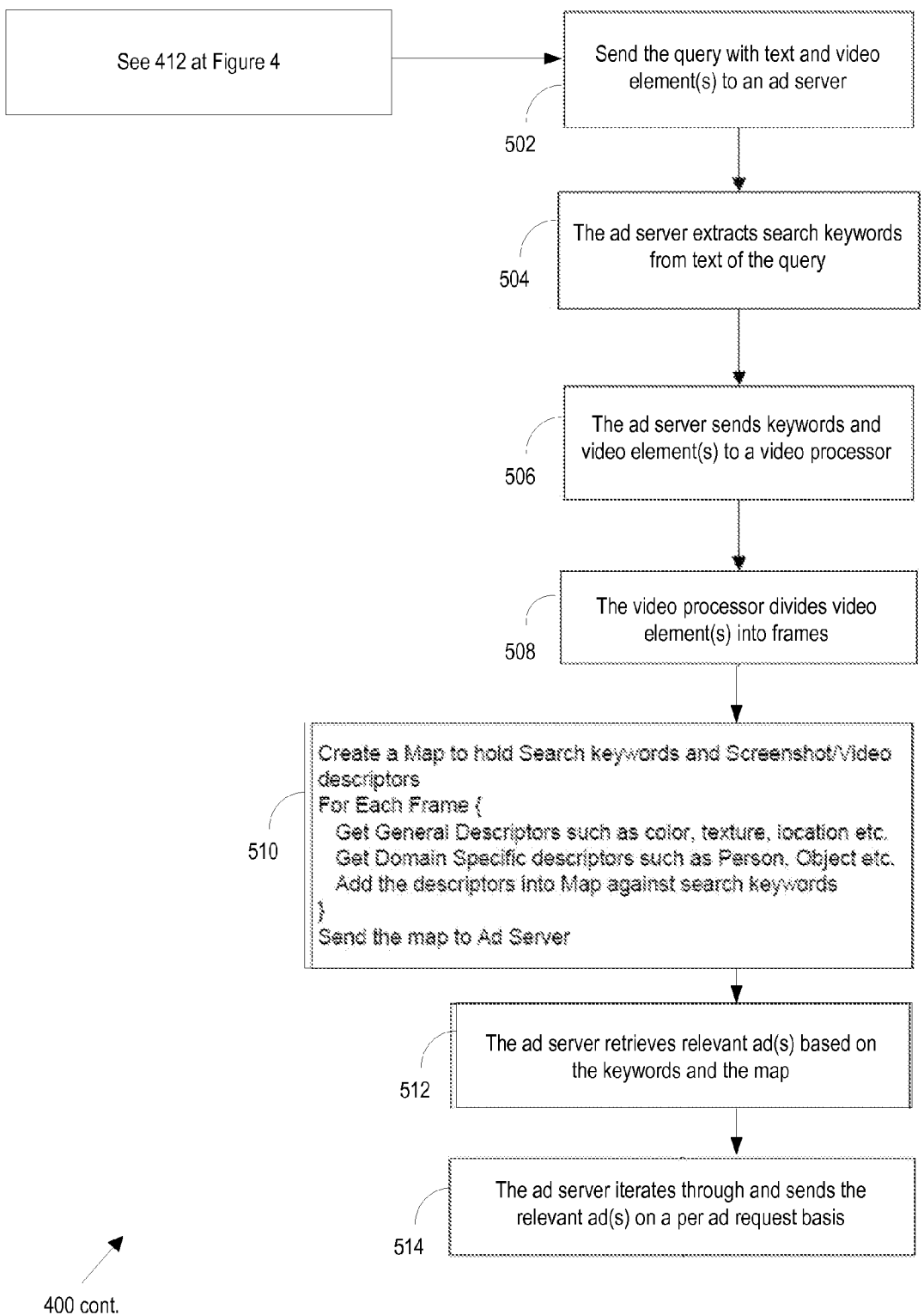
Figure 6:
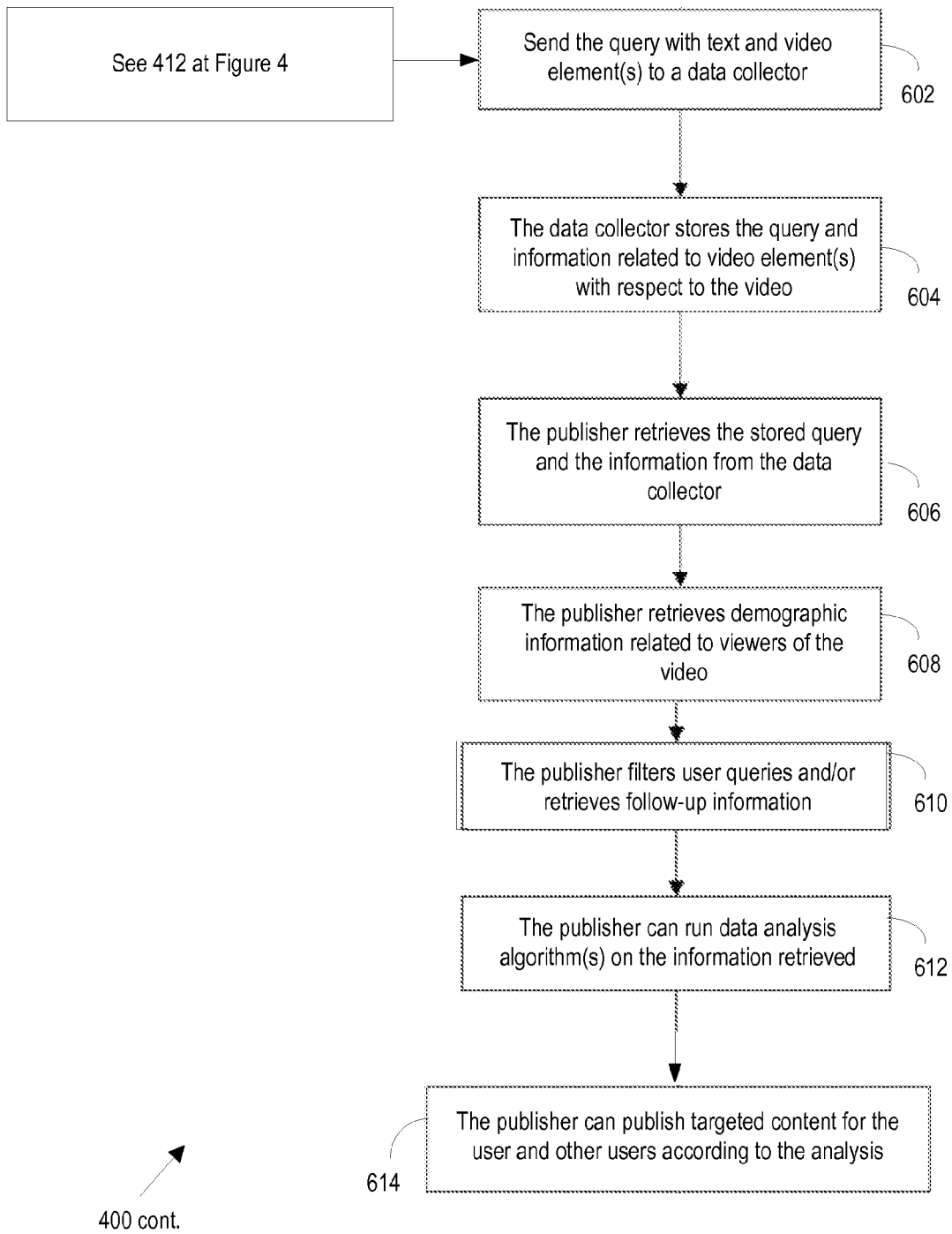

FIGS. 4-6 illustrate a flowchart of an example method that can be performed by one or more aspects of a video analysis system, such as the electronic device 200 (method 400). A processor (e.g., the processor 202) can perform one or more aspects of the method 400 by executing processing device readable instructions encoded in memory (e.g., the memory 210). The instructions encoded in memory may include a software aspect of the system, such as the VAS software 223.

Method 400 may include a user requesting a video. At 402 of FIG. 4, a display of the VAS may present the video to the user. At 404, the display may also present a graphic user interface element associated with initiating a query. Also, a user may use a remote control having a button that is associated with initiating a query function. At 406, an interface of the VAS my receive user input to start a query function. The query function may include processes for collecting query terms and other query elements, and executing a query based on the terms and elements. At 408, a processor of the VAS may pause the video and provide an interface for the user to enter query parameters, including text-based parameters and graphical parameters. The interface may include aspects that facilitate user selection of one or more video elements, such as one or more frames of the video or one or more regions of a frame of the video. At 410A and 410B, a query interface of the VAS, receives a user query input including video element(s), such as one or more frames of the video and/or one or more snapshots of one or more regions of one or more frames of the video. At 412, the query interface receives a request by the user to execute the inputted query.

At 502 of FIG. 5, the query interface of the VAS may send the user's query to an ad server. At 504, the ad server may extract search keywords from the text portion of the query. At 506, the ad server may send the keywords and the video element(s) to a video processor of the VAS, such as a video processor of the ad server. At 508, the video processor divides the video element(s) into processed frames.

At 510, a map may be generated by the video processor that maps the keywords and the processed frames, such as mapping the keywords with respect to the processed frames or metadata associated with the frames. For example, for a processed frame, the processor may extract one or more graphical descriptors for the frame, such as one or more descriptors of colors, textures, graphical objects, people, locations of the objects and/or people, etc. The graphical descriptors may be generic with respect to the frame or may be specific with respect to domains or regions of the frame. For example, a descriptor may indicate that the frame is bright with low contrast. Or, for example, a descriptor may indicate that a particular celebrity in the frame is holding a particular product, the product being a particular color predominantly.

Also, for a processed frame the descriptors may be mapped against keywords. The video processor may also distribute the map. At 512, the ad server may retrieve one or more relevant ads based on the keywords and/or the map. At 514, a processor and/or the ad server of the VAS may iterate through and send the relevant ad(s) per ad request, such as an ad request associated with the user. For example, the user may be watching other video content that may request a targeted ad from the ad server of the VAS.

At 602 of FIG. 6, the query interface of the VAS may send the user's query to a data collector (such as a data collector application of application server 109). The query may include the entered text and the selected video element(s). The data collector may host a database management system (DBMS), for example. At 604, the data collector may store the query and/or information associated with the video element(s) with respect to the video, in a database via a DBMS, for example. Also, the video element(s) may be mapped with original elements of the video or metadata associated with the video via a DBMS.

At 606, from the data collector, a publisher of video content may retrieve the stored query and/or the information associated with the video element(s). At 608, the publisher may retrieve demographic information related to viewers of the video. At 610, the publisher may filter user queries and/or retrieve follow-up information corresponding to the queries from the user and/or other users or viewers of the video. At 612, the publisher can run one or more data analysis algorithms (e.g., one or more web analytics algorithms, categorizing segmentation algorithms, and frequency determining sequence analysis algorithms) on information retrieved at 606-610. At 614, the publisher can publish targeted content for the user and other users/viewers according to the results from the algorithm(s) at 612.

The keywords may also be sent to a search server (such as search server 107) to initiate an Internet search. The results of the Internet search may be included with the video content or contribute to the one or more data analysis algorithms, for example.

An example system may include an interface, memory, and a processor configured to execute instructions stored in the memory (such as processor 202 and memory 210). The interface (such as a user input/output interface(s) 240) may be configured to receive a signal that may include one or more user-selected frames of video content and/or a user entered string, such as a string corresponding to at least a portion of an Internet search query or a voice or text message. The string may include a symbol, character, word, or phrase, for example.

The processor, communicatively coupled to the memory and interface, may execute the instructions to identify a market-relevant video object and/or string portion, e.g., a market-relevant word, in the one or more frames and/or in the string, respectively. Also, the processor may facilitate storing in the memory, market-relevant information associated with the market-relevant video object and/or string portion. The processor may also execute the instruction to compare the stored market-relevant information to stored advertisement information and determine an advertisement for distribution to a user based on the comparison. Alternatively or additionally, ad request criteria may be determined based on the comparison. An ad request may be a request to a server, e.g., an ad server (such as advertisement server 108), for one or more advertisements. Ad request criteria may include rules and/or parameters for selection of one or more advertisements, and/or may indicate one or more advertisements for selection, for example.

Alternatively or additionally, the received signal may include metadata associated with the video content, the one or more user selected frames, or the market-relevant video object, for example. Regarding the metadata, the processor may execute the instructions to store the metadata in the memory. The instructions may also be executed to compare the stored metadata to the stored advertisement information and to determine the advertisement for distribution to the user based on the comparisons of the stored market-relevant information and the metadata to the stored advertisement information. Alternatively or additionally, ad request criteria may be determined based on these comparisons.

Also, the received signal may include audio data associated with the one or more user-selected frames. Regarding the audio data, the processor may execute the instructions to identify an audio object, such as a word, in the audio data and store market-relevant information associated with the audio object in the memory. The instructions may also be executed to compare the market-relevant information associated with the audio object to the stored advertisement information. The instructions may also be executed to determine the advertisement for distribution to the user based on the comparisons of the stored advertisement information to the market-relevant information associated with the video object, the string portion, and/or the audio object. Alternatively or additionally, ad request criteria may be determined based on these comparisons.

The advertisement for distribution to the user may be based on the comparisons of the stored advertisement information to one or more of the metadata, the market-relevant information associated with the video object, the market-relevant information associated with string portion, or the market-relevant information associated with the audio object. Alternatively or additionally, ad request criteria may be determined based on these comparisons.

Additionally, the one or more user-selected frames may be selected by a user at a user interface (such as a user input/output interface(s) 240) embedded in or communicatively coupled with an electronic device providing the video content to the user (such as any of client devices 101-104). The frames may be selected while the video content is playing or paused. The user interface may include a voice operated and/or graphical user interface, for example. And the one or more user-selected frames may be selected by the user via the voice operated user interface.

Also, the instructions of the system may be executable to transmit via the interface, a request to an advertisement server (such as advertisement server 108), via one or more networks (such as LAN/WAN 112 and wireless network 110), to transmit the advertisement to the electronic device to provide the advertisement during playing of the video content.

Also, the electronic device may communicate the signal that may include the one or more user-selected frames directly to the interface or via an intermediary that filters the signal (such as a filtering application of the application server 109).

While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents.

Subject matter may be embodied in a variety of different forms and, therefore, covered or claimed subject matter is intended to be construed as not being limited to any example set forth herein; examples are provided merely to be illustrative. Among other things, for example, subject matter may be embodied as methods, devices, components, or systems. Accordingly, subject matter may take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. The terminology used in the specification is not intended to be limiting of example of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises," "comprising," " " and/or "including," when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

I claim:

1. A system implemented in an electronic device, the system comprising:
   an interface receives a signal from a user electronic device, the signal including a user entered string, user selected frames of video content, and audio data, wherein the audio data corresponds to the video content and the user selected frames, wherein the user selected frames and the string are entered by a user while the video content is playing, and wherein the user selected frames are selected by the user via a user interface embedded in or communicatively coupled with the user electronic device providing the video content to the user;

a memory that includes processor-executable instructions; and a processor connected to the memory and the interface, the processor executes the processor-executable instructions to:

identify a perceivable market-relevant video object in the user selected frames;

store in the memory, first market-relevant information associated with the perceivable market-relevant video object and the user entered string;

identify a perceivable audio object sound in the audio data;

store in the memory, second market-relevant information associated with the perceivable audio object sound;

compare the first market-relevant information to stored advertisement information;

compare the second market-relevant information to the stored advertisement information;

determine an advertisement for distribution to user of the user electronic device based on the comparisons of the first stored market-relevant information and the second stored market-relevant information to the stored advertisement information; and distribute the advertisement to the user of the user electronic device for displaying the advertisement during the video content in response to receiving, via the user interface, an ad request criteria, wherein the advertisement is distributed based on the comparisons.

2. The system of claim 1, where the processor executes the processor-executable instructions to:

identify a string portion in the user entered string;

store in the memory, third market-relevant information associated with the string portion;

compare the third stored market-relevant information to the stored advertisement information; and determine the advertisement for distribution to the user based on the comparison of the third stored market-relevant information to the stored advertisement information.

3. The system of claim 1, where the signal includes metadata associated with the video content, the user selected frames, or the perceivable market-relevant video object, and where the processor executes the processor-executable instructions to:

store in the memory, the metadata;

compare the stored metadata to the stored advertisement information; and determine the advertisement for distribution to the user based on the comparison of the metadata to the stored advertisement information.

4. The system of claim 1, where the processor executes the processor-executable instructions to:

identify a word in the audio data;

store in the memory, third market-relevant information associated with the word;

compare the third market-relevant information to the stored advertisement information; and determine the advertisement for distribution to the user based on the comparison of the third stored market-relevant information to the stored advertisement information.

5. The system of claim 1, where the user entered string corresponds to at least a portion of a voice message communicated by the user to another individual while the video content is playing or paused.

6. A method implemented in an electronic device, the method comprising:

receiving, at an interface of the electronic device, a signal from a user electronic device, the signal includes a user entered string, user selected frames of video content, and audio data, the audio data corresponding to the video content and the user selected frames, wherein the user selected frames and the user entered string are entered by a user while the video content is playing, and wherein the user selected frames are selected by the user via a user interface embedded in or communicatively coupled with the user electronic device providing the video content to the user;

identifying, by a processor of the electronic device, a perceivable market-relevant video object in the user selected frames;

storing, in memory of the electronic device, first market-relevant information associated with the perceivable market-relevant video object and the user entered string;

identifying, by the processor, a perceivable audio object sound in the audio data; storing in the memory, second market-relevant information associated with the perceivable audio object sound;

comparing, by the processor, the first stored market-relevant information to stored advertisement information;

comparing, by the processor, the second stored market-relevant information to the stored advertisement information;

determining, by the processor, ad request criteria based on the comparisons of the first stored market-relevant information and the second stored market-relevant information to the stored advertisement information; and transmitting, by an advertisement server, an advertisement to the user of the user electronic device for displaying the advertisement during the video content in response to receiving, via the user interface, an ad request criteria from the user electronic device, wherein the advertisement is transmitted based on the comparisons.

7. The method of claim 6, comprising:

identifying, by the processor, a market-relevant string portion in the user entered string;

storing, in the memory, third market-relevant information associated with the market-relevant string portion;

comparing, by the processor, the third stored market-relevant information to the stored advertisement information; and determining, by the processor, the ad request criteria based on the comparison of the third stored market-relevant information to the stored advertisement information.

8. The method of claim 6, comprising:

receiving, at the interface, metadata associated with the video content, the user selected frames, or the perceivable market-relevant video object;

storing, in the memory, the metadata;

comparing, by the processor, the metadata to the stored advertisement information; and determining, by the processor, the ad request criteria based on the comparison of the metadata to the stored advertisement information.

9. The method of claim 6, where the user electronic device communicates the signal that includes the user selected frames directly to the user interface or via an intermediary that filters the signal.

10. The method of claim 6, where the user interface includes a graphical user interface.

11. The method of claim 6, where the user interface includes a voice operated user interface, and where the user selected frames are selected by the user via the voice operated user interface.

12. a method implemented in an electronic device, the method comprising:
  receiving, at an interface of the electronic device, a signal from a user electronic device, the signal includes a user entered string and user selected frames of video content and audio data, the audio data corresponding to the video content and the user selected frames, wherein the user selected frames and the user entered string are entered by a user while the video content is playing, and wherein the user selected frames are selected by the user via a user interface embedded in or communicatively coupled with the user electronic device providing the video content to the user;
  identifying, by a processor of the electronic device, a market-relevant string portion in the user entered string;
  identifying, by the processor, a perceivable market-relevant audio object sound in the user selected frames;
  storing, in memory of the electronic device, market-relevant information associated with the perceivable market-relevant string portion and the market-relevant audio object sound;
  comparing, by the processor, the stored market-relevant information to stored advertisement information;
  determining, by the processor, ad request criteria based on the comparison; and
  transmitting, by an advertisement server, an advertisement to the user electronic device for displaying the advertisement during the video content in response to receiving, via the user interface, the ad request criteria from the user electronic device, wherein the advertisement is determined based on the comparison.

13. The method of claim 12, comprising:
  receiving, at the interface, the signal that includes metadata associated with the video content;
  storing, the metadata in the memory;
  comparing, by the processor, the metadata to the stored advertisement information; and
  determining, by the processor, the ad request criteria based on the comparisons of the stored market-relevant information and the metadata to the stored advertisement information.

14. The method of claim 12, where the user entered string corresponds to a portion of a text message.

15. The method of claim 12, where the user entered string corresponds to an Internet search query.

16. The method of claim 12, where the market-relevant string portion includes a symbol, character, word, or phrase that an advertiser has designated as relevant to advertising.

* * * * *